United States Patent
Kim et al.

(10) Patent No.: US 11,663,907 B2
(45) Date of Patent: May 30, 2023

(54) METHOD AND APPARATUS FOR TRANSMITTING AND RECEIVING VEHICLE-TO-PEDESTRIAN (V2P) MESSAGE

(71) Applicants: Hojun Kim, Yongin-si (KR); Yongtae Park, Seongnam-si (KR); Wonyong Dong, Yongin-si (KR)

(72) Inventors: Hojun Kim, Yongin-si (KR); Yongtae Park, Seongnam-si (KR); Wonyong Dong, Yongin-si (KR)

(73) Assignee: ETTIFOS CO., Seoul (KR)

( * ) Notice: Subject to any disclaimer, the term of this patent is extended or adjusted under 35 U.S.C. 154(b) by 0 days.

(21) Appl. No.: 17/837,134

(22) Filed: Jun. 10, 2022

(65) Prior Publication Data

US 2022/0406171 A1    Dec. 22, 2022

(30) Foreign Application Priority Data

Jun. 21, 2021   (KR) .................. 10-2021-0080217
Jan. 18, 2022   (KR) .................. 10-2022-0007415

(51) Int. Cl.
*H04W 4/40*    (2018.01)
*G08G 1/005*   (2006.01)

(52) U.S. Cl.
CPC .............. *G08G 1/005* (2013.01); *H04W 4/40* (2018.02)

(58) Field of Classification Search
CPC ............................... G08G 1/005; H04W 4/40
USPC ......................................................... 340/944
See application file for complete search history.

(56) References Cited

U.S. PATENT DOCUMENTS

| | | | |
|---|---|---|---|
| 10,819,389 B2 | 10/2020 | Lu | |
| 11,405,786 B1* | 8/2022 | Monteuuis | H04W 12/106 |
| 2003/0159066 A1* | 8/2003 | Staw | H04L 69/329 |
| | | | 380/258 |
| 2004/0073512 A1* | 4/2004 | Maung | H04L 63/068 |
| | | | 705/51 |
| 2005/0215234 A1* | 9/2005 | Fukuzawa | H04M 3/38 |
| | | | 455/411 |
| 2009/0009339 A1* | 1/2009 | Gorrell | G08B 25/10 |
| | | | 340/573.1 |

(Continued)

FOREIGN PATENT DOCUMENTS

| CN | 107613527 | 2/2021 |
|---|---|---|
| KR | 1 0-2020-0095474 | 2/2019 |

(Continued)

OTHER PUBLICATIONS

Discussion and Proposals on Traffic Models for V2I and V2P, 3GPP TSG RAN WG1 Meeting #83, CATT, Nov. 22, 2015.

(Continued)

*Primary Examiner* — Kerri L McNally
*Assistant Examiner* — Thang D Tran
(74) *Attorney, Agent, or Firm* — Radlo & Su (57) ABSTRACT

In an aspect of the present disclosure, there is provided a method of transmitting a vehicle-to-pedestrian (V2P) message. The method may comprise checking whether a timer is running, generating and storing an identifier when the timer is not running, encoding a personal safety message (PSM) according to a predetermined method and storing the encoded PSM as a lead V2P message and transmitting the generated identifier and the lead V2P message.

14 Claims, 5 Drawing Sheets

(56) References Cited

U.S. PATENT DOCUMENTS

| | | | | |
|---|---|---|---|---|
| 2009/0196206 | A1* | 8/2009 | Weaver | H01Q 21/205 370/310 |
| 2009/0227212 | A1* | 9/2009 | Lim | H04W 28/06 455/72 |
| 2010/0142365 | A1* | 6/2010 | Richardson | H04L 27/10 370/336 |
| 2012/0155636 | A1* | 6/2012 | Muthaiah | H04L 9/0825 380/44 |
| 2012/0314864 | A1* | 12/2012 | Ramprasad | H04L 63/065 380/270 |
| 2014/0119195 | A1* | 5/2014 | Tofighbakhsh | H04W 52/0251 370/328 |
| 2014/0273856 | A1* | 9/2014 | Kyles | H04W 76/28 455/41.2 |
| 2015/0365560 | A1* | 12/2015 | Naito | H04N 1/32767 358/1.15 |
| 2017/0126654 | A1* | 5/2017 | Fu | H04L 9/0858 |
| 2018/0007647 | A1* | 1/2018 | Bilstad | H04N 21/4302 |
| 2018/0212780 | A1* | 7/2018 | Talamonti | G05D 1/0022 |
| 2019/0020987 | A1* | 1/2019 | Khoryaev | H04W 76/14 |
| 2019/0028925 | A1* | 1/2019 | Chun | H04W 28/04 |
| 2019/0206165 | A1* | 7/2019 | Chang | G07C 9/00571 |
| 2020/0128479 | A1* | 4/2020 | Xu | H04W 8/24 |
| 2020/0159685 | A1* | 5/2020 | Askeland | G06F 11/34 |
| 2020/0235946 | A1* | 7/2020 | Lee | H04L 9/3268 |
| 2021/0067926 | A1* | 3/2021 | Hwang | H04W 4/44 |
| 2021/0160674 | A1* | 5/2021 | Takla | H04W 4/90 |
| 2021/0345110 | A1* | 11/2021 | Revadigar | H04W 12/50 |
| 2021/0377795 | A1* | 12/2021 | Guo | H04W 28/0289 |
| 2022/0030548 | A1* | 1/2022 | Chun | H04W 60/005 |
| 2022/0038903 | A1* | 2/2022 | Fu | H04W 12/088 |
| 2022/0068120 | A1* | 3/2022 | Alfano | G08G 1/093 |
| 2022/0086609 | A1* | 3/2022 | Hwang | H04W 4/023 |
| 2022/0104164 | A1* | 3/2022 | Kedalagudde | H04W 60/04 |
| 2022/0132449 | A1* | 4/2022 | Baglin | H04W 56/005 |
| 2022/0242342 | A1* | 8/2022 | Nagpal | H04M 1/72412 |

FOREIGN PATENT DOCUMENTS

| | | |
|---|---|---|
| KR | 10-2019-0011582 | 2/2019 |
| KR | 10-2019-0049037 | 5/2019 |
| KR | 10-2019-003209 | 12/2020 |
| KR | 10-2209453 | 1/2021 |
| KR | 10-2214558 B1 | 2/2021 |

OTHER PUBLICATIONS

European Search Report for European Patent Application No. 22179000.9, dated Sep. 14, 2022.

Notice of Allowance by the Korean Intellectual Property Office for Application No. 10-2022-0007415, dated Jul. 27, 2022.

Sepulcre, Miguel et al., "On the Potential of V2X Message Compression for Vehicular Networks", IEEE Access, vol. 8, 2020, pp. 214254-214268, Dec. 1, 2020.

Sepulcre, Miguel et al., "Can Beacons be Compressed to Reduce the Channel Load in Vehicular Networks?", 2018 IEEE Vehicular Networking Conference (VNC), 2018.

* cited by examiner

METHOD AND APPARATUS FOR TRANSMITTING AND RECEIVING VEHICLE-TO-PEDESTRIAN (V2P) MESSAGE

TECHNICAL FIELD

The present disclosure relates to a communication method and apparatus for transmitting and receiving a vehicle-to-pedestrian (V2P) message, and more particularly, to a method and apparatus for transmitting and receiving a V2P message while minimizing power consumption.

BACKGROUND ART

For vehicle-to-everything (V2X) communication, communication standards such as Wireless Access in Vehicular Environments (WAVE), Long Term Evolution vehicle-to-everything (LTE-V2X) sidelink, etc. have been currently used. In the V2X communication, transmission and reception were performed by a vehicle, a central network, and infrastructure, and so on, and thus, there were no restrictions on power consumption.

Vehicle-to-pedestrian (V2P) communication has begun to be introduced. For the V2P communication, a pedestrian (hereinafter referred to as a vulnerable road user (VRU)) needs to carry a terminal that receives power from the battery, and thus, constraints on power consumption are likely to be an important issue.

No communication standards have been determined for the V2P communication. Considering the implementation environment, if a V2X communication modem is separately provided in a VRU terminal, it may cause problems such as an increase in the price of the terminal and the speed of dissemination of new terminal devices. Therefore, it would be desirable to use communication standards supported by terminals (e.g., a smartphone) that are currently distributed to many VRUs.

Among the above communication standards, Bluetooth, and more particularly, Bluetooth Low Energy (BLE), which is judged to be supported by most VRU terminals, is optimized to periodically transmit information to the surroundings. Thus, BLE has the advantage of establishing an environment for the V2P communication only with application development.

In addition, in recent years, a modem for ultra-wideband (UWB) communication has been distributed to devices such as smartphones. The UWB communication may also be used as a communication standard for the V2P communication.

DISCLOSURE

Technical Problem

An object of the present disclosure is to provide a communication method and apparatus for transmitting and receiving a vehicle-to-pedestrian (V2P) message while minimizing power consumption.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of transmitting a vehicle-to-pedestrian (V2P) message. The method may include: checking whether a timer is running; generating and storing an identifier when the timer is not running; encoding a personal safety message (PSM) according to a predetermined method and storing the encoded PSM as a lead V2P message; and transmitting the generated identifier and the lead V2P message. The identifier may be used to identify the lead V2P message and refer to the lead V2P message to decompress a compressed V2P message.

Additionally or alternatively, the method may include: compressing and encoding a PSM according to a predetermined method based on the stored lead V2P message when the timer is running; and transmitting the compressed V2P message including the previously stored identifier and the compressed PSM.

Additionally or alternatively, the method may include starting the timer after generating and storing the identifier.

Additionally or alternatively, compressing the PSM may include removing a predetermined field included in the lead V2P message from the compressed V2P message.

Additionally or alternatively, compressing the PSM may include, for a predetermined field in the PSM which is the same as the predetermined field in the lead V2P message, including a delta value corresponding to a difference from a value of the predetermined field of the lead V2P message as the predetermined field of the compressed V2P message.

Additionally or alternatively, each of the lead V2P message and the compressed V2P message may include a compression indicator indicating whether the message is compressed.

In another aspect of the present disclosure, there is provided a method of receiving a V2P message. The method may include: receiving a V2P message including an identifier, a compression indicator, and a PSM; and matching and storing the identifier and the received V2P message when the compression indicator indicates that the PSM is not compressed. The received V2P message may be stored as a lead V2P message, and the identifier may be used to identify the lead V2P message and refer to the lead V2P message to decompress a compressed V2P message.

Additionally or alternatively, the method may include, when the compression indicator indicates that the PSM is compressed, decompressing the received V2P message based on a previously stored lead V2P message corresponding to the identifier.

Additionally or alternatively, the method may include, when the compression indicator indicates that the PSM is compressed, discarding the received V2P message if an identifier which is the same as the received identifier is not previously stored.

Additionally or alternatively, decompressing the received V2P message may include restoring a predetermined field in the received V2P message to a field for a PSM of the previously stored lead V2P message.

In another aspect of the present disclosure, there is provided a transmitting apparatus configured to transmit a V2P message. The transmitting apparatus may include: a memory; a processor; and a transceiver. The processor may be configured to: check whether a timer is running; generate and store an identifier when the timer is not running; encode a PSM according to a predetermined method and store the encoded PSM as a lead V2P message in the memory; and control the transceiver to transmit the generated identifier and the lead V2P message. The identifier may be used to identify the lead V2P message and refer to the lead V2P message to decompress a compressed V2P message.

In another aspect of the present disclosure, there is provided a receiving apparatus configured to receive a V2P message. The receiving apparatus may include: a memory; a processor; and a transceiver. The processor may be configured to: control the transceiver to receive a V2P message including an identifier, a compression indicator, and a PSM; and match the identifier and the received V2P message and store the identifier and the received V2P message in the memory when the compression indicator indicates that the PSM is not compressed. The received V2P message may be stored as a lead V2P message, and the identifier may be used to identify the lead V2P message and refer to the lead V2P message to decompress a compressed V2P message.

In a further aspect of the present disclosure, there is provided a computer program stored on a computer-readable medium and configured to perform the above-described method It will be understood by those skilled in the art that the above-described aspects of the present disclosure are merely part of embodiments of the present disclosure and various modifications and alternatives could be developed from the following technical features of the present disclosure.

Advantageous Effects

The present disclosure have the following effects.

According to the present disclosure, when a vehicle-to-pedestrian (V2P) message is transmitted, the size of the message may be reduced by compression. Accordingly, the usage of the channel may be reduced, thereby improving the communication environment.

According to the present disclosure, power consumption may be minimized when a V2P message is transmitted.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure, illustrate embodiments of the disclosure and together with the description serve to explain the principle of the present disclosure.

BEST MODE

Hereinafter, embodiments of the present disclosure will be described with reference to the accompanying drawings.

However, the present disclosure is not limited to the embodiments described herein and may be implemented in various other forms. The terminology used in this specification is intended to help the understanding of the embodiments. That is, the terminology is not intended to limit the scope of the present disclosure. In addition, singular forms used herein may imply plural forms unless the forms clearly represent the opposite.

First, the terms and basic encoding methods used in this document will be described.

In this specification, once a timer starts, the timer may continue to operate until the timer stops or expires. The timer may start in an idle state, or the timer may restart while in operation. When the timer starts or restarts, the timer may always start or restart from an initial value.

In the present specification, a vehicle-to-pedestrian (V2P) message refers to a message including a wireless access in vehicular environments (WAVE) short message protocol (WSMP) header of the Institute of Electrical and Electronics Engineers (IEEE) 1609.3, a security header of IEEE 1609.2, a personal safety message (PSM) of IEEE 1609.2 and the Society of Automotive Engineers (SAE) J2735, and so on. Hereinafter, the V2P message will be described in brief.

As an example of generating the V2P message, three layers may be used. The three layers are an application layer, a security layer, and a network layer in order from higher to lower layers.

The PSM of IEEE 1609.2 SAE J2735 is data in the form of a message frame, which is obtained by encoding based on unaligned packed encoding rules (UPER). The PSM may include specific information that a vulnerable road user (VRU) desires to transmit to a vehicle, for example, information on the type, location, direction, speed, and so on of the VRU. However, the information is not limited thereto.

Security data of IEEE 1609.2 consists of the PSM of IEEE 1609.2 SAE J2735 PSM and the security header of IEEE 1609.2 described above. The security header of IEEE 1609.2 includes certificate information to sign the PSM and signature information about the PSM, which is encoded by octet encoding rules (OER).

A WSMP message of IEEE 1609.3 consists of the security data of IEEE 1609.2 used for V2P communication and the WSMP header of IEEE 1609.3. The WSMP header of IEEE 1609.3 includes characteristic information on a vehicle-to-everything (V2X) communication means, which is encoded by the UPER.

Herein, V2P messages are largely divided into two types: a lead message and a compressed message. The lead message refers to a V2P message including a non-compressed PSM and transmitted with a new identifier. The compressed message refers to a V2P message including a compressed PSM and transmitted together with the identifier of the lead message after transmission of the lead message. That is, the V2P message includes the lead message and the compressed message, and these messages may be called various names.

Figure 1:
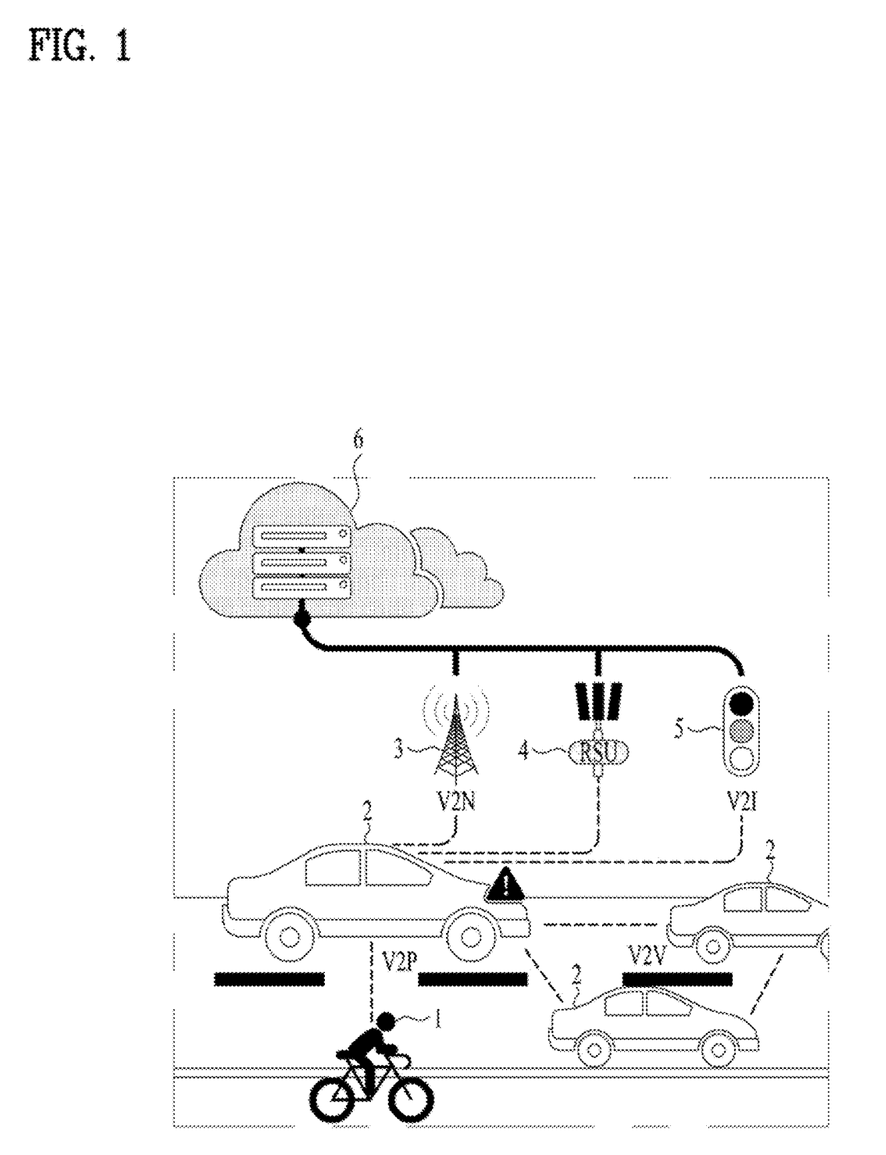
FIG. 1 illustrates a communication environment to which the present disclosure is applied.

FIG. 1 illustrates a communication environment to which the present disclosure is applied.

V2X refers to a communication system involving wireless communication between a vehicle 2 and a vehicle 2 (vehicle-to-vehicle (V2V)). V2V wireless communication not only plays a basic role of notifying nearby vehicles of information such as the location, direction, and speed of a vehicle but also serves to inform potential hazards such as sudden braking and turning.

In addition, V2X refers to a system in which a vehicle communicates and shares with various elements on a road for autonomous driving, which involves wireless communication between a vehicle and a network 3 (vehicle-to-network (V2N)), wireless communication between a vehicle and a road side unit (RSU) 4, and wireless communication between a vehicle and transportation infrastructure 5 (vehicle-to-infrastructure (V2I)).

Vehicles may inform each other of danger based on communication therebetween and check information such as parking locations and signal change times based on communication between the vehicles and transportation infrastructure such as parking lots and traffic lights. Thus, V2X is considered as a necessary technology for perfect autonomous driving.

In addition, V2X communication may also be extended to a person 1 around the road. Such communication is referred to as V2P. The present disclosure will be described in the context of V2P communication.

Figure 2:
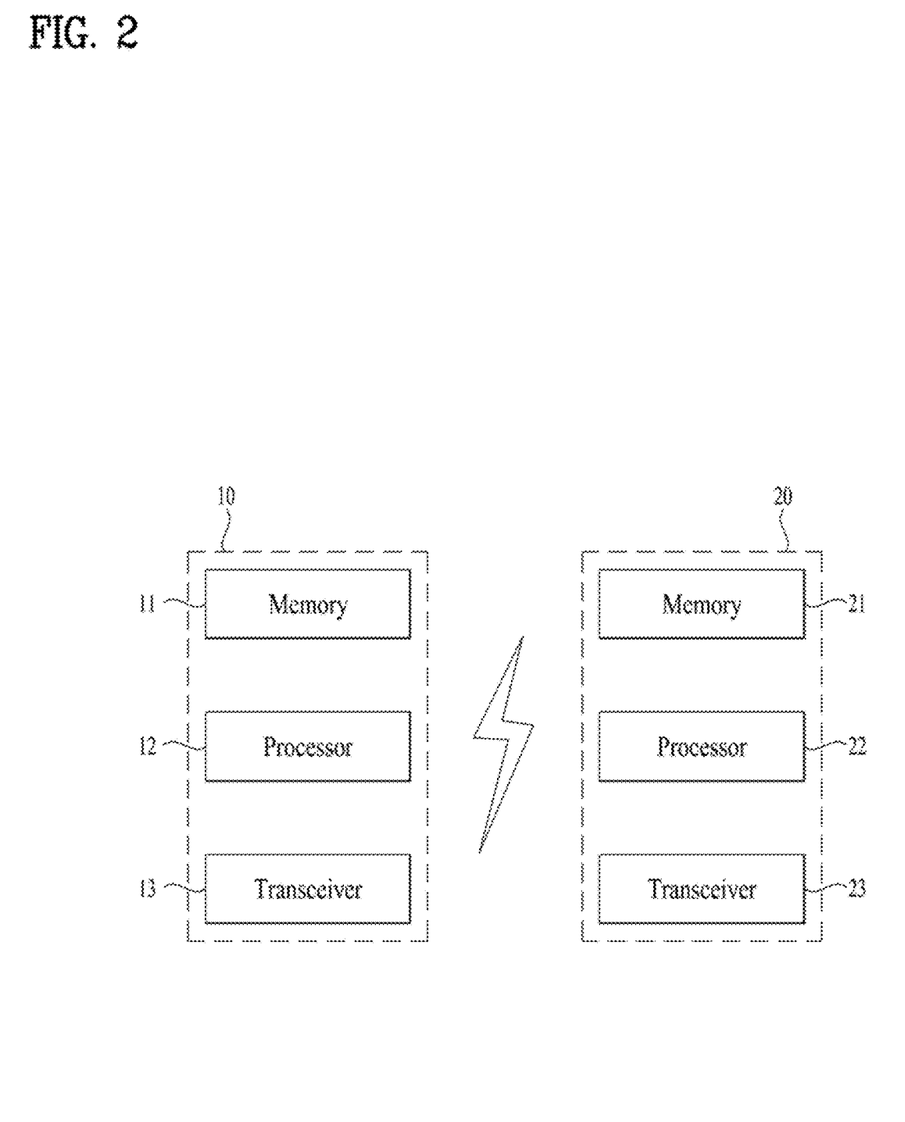
FIG. 2 is a block diagram of a transmitting device and a receiving device exchanging vehicle-to-pedestrian (V2P) messages according to an embodiment of the present disclosure.

FIG. 2 is a block diagram of a transmitting device 10 and a receiving device 20 exchanging V2P messages according to an embodiment of the present disclosure.

The transmitting device 10 refers to a device performing transmission, for example, transmission of messages for V2P communication. However, since communication always involves transmission and reception, the transmission device 10 may also receive messages.

The transmitting device 10 may include: a memory 11 configured to store messages, information, etc.; a processor 12 configured to process messages, information, etc.; and a transceiver 13 configured to transmit or receive messages, information, etc.

The receiving device 20 refers to a device performing reception, for example, reception of messages for V2P communication. The receiving device 20 may also transmit messages.

The receiving device 20 may include: a memory 21 configured to store messages, information, etc.; a processor 22 configured to process messages, information, etc.; and a transceiver 23 configured to transmit or receive messages, information, etc.

If the transmitting device 10 is a VRU terminal, the receiving device 20 may be a terminal mounted on a vehicle, and vice versa.

Hereinafter, the proposals of the present disclosure will be described in brief.

The transmitting device 10 is a device for transmitting V2P messages. The processor 12 of the transmitting device 10 may check whether a timer is running. If the timer is not running, the processor 12 may generate an identifier and store the identifier in the memory 11. Thereafter, the processor 12 may encode a PSM according to a predetermined method and store the encoded PSM as a lead message in the memory 11. The predetermined method refers to a method based on communication standards such as IEEE 1609.2 and IEEE 1609.3 described above, but the method is not limited thereto. The processor 12 may transmit the generated identifier and the lead message to the receiving device 20 through the transceiver 13.

On the other hand, if the timer is running, the processor 12 may compress and encode a PSM according to a predetermined method based on a previously stored lead message. Then, the processor 12 may transmit a compressed message including a previously stored identifier and the compressed PSM to the receiving device 20.

As described above, the transmitting device 10 may generate an identifier based on a timer and transmit a PSM in a lead message or compressed message together with the identifier, thereby reducing power consumption and consequently increasing transmission efficiency.

The procedure for transmitting V2P messages has been described with reference to FIG. 1. Hereinafter, a procedure for receiving V2P messages will be described.

The receiving device 20 is a device for receiving V2P messages. The processor 22 of the receiving device 20 may receive a V2P message including an identifier, a compression indicator, and a PSM through the transceiver 23. The processor 22 may check the compression indicator included in the received V2P message. For example, the compression indicator may have a one-bit value. Specifically, if the bit value is 0, the compression indicator may indicate that the PSM is not compressed, and if the bit value is 1, the compression indicator may indicate that the PSM is compressed.

When the compression indicator indicates that the PSM is not compressed, the processor 22 may match the identifier in the received V2P message with the received V2P message or the PSM in the received V2P message and then store the identifier and the received V2P message or the PSM in the received V2P message. Thereafter, the processor 22 may decode the received V2P message or the PSM.

When the compression indicator indicates that the PSM is compressed, the processor 22 may check whether a stored identifier is identical to the identifier in the received V2P message. If the identifier stored in the memory 21 is identical to the identifier in the received V2P message, the processor 22 may decode the received V2P message or the PSM in the received V2P message based on a previously stored V2P message corresponding to the identifier in the received V2P message or a PSM included in the previously stored V2P message. Herein, decoding of the V2P message or PSM means replacing a predetermined field in the received V2P message with a related field in the previously stored V2P message or the PSM included in the previously stored V2P message or deriving the predetermined field from the related field.

If the previously stored identifier is not identical to that in the received V2P message, the processor 22 may discard the received V2P message.

As described above, even if a PSM is transmitted in a V2P message after being compressed according to the present disclosure, the receiving device 20 may decode the V2P message or the PSM, thereby achieving communication with less power, compared to the prior art. In addition, since the receiving device 20 is capable of identifying the PSM or V2P message to refer to from an identifier, the receiving device 20 may easily perform decoding.

Hereinafter, the proposals of the present disclosure will be described with reference to the remaining drawings.

Figure 3:
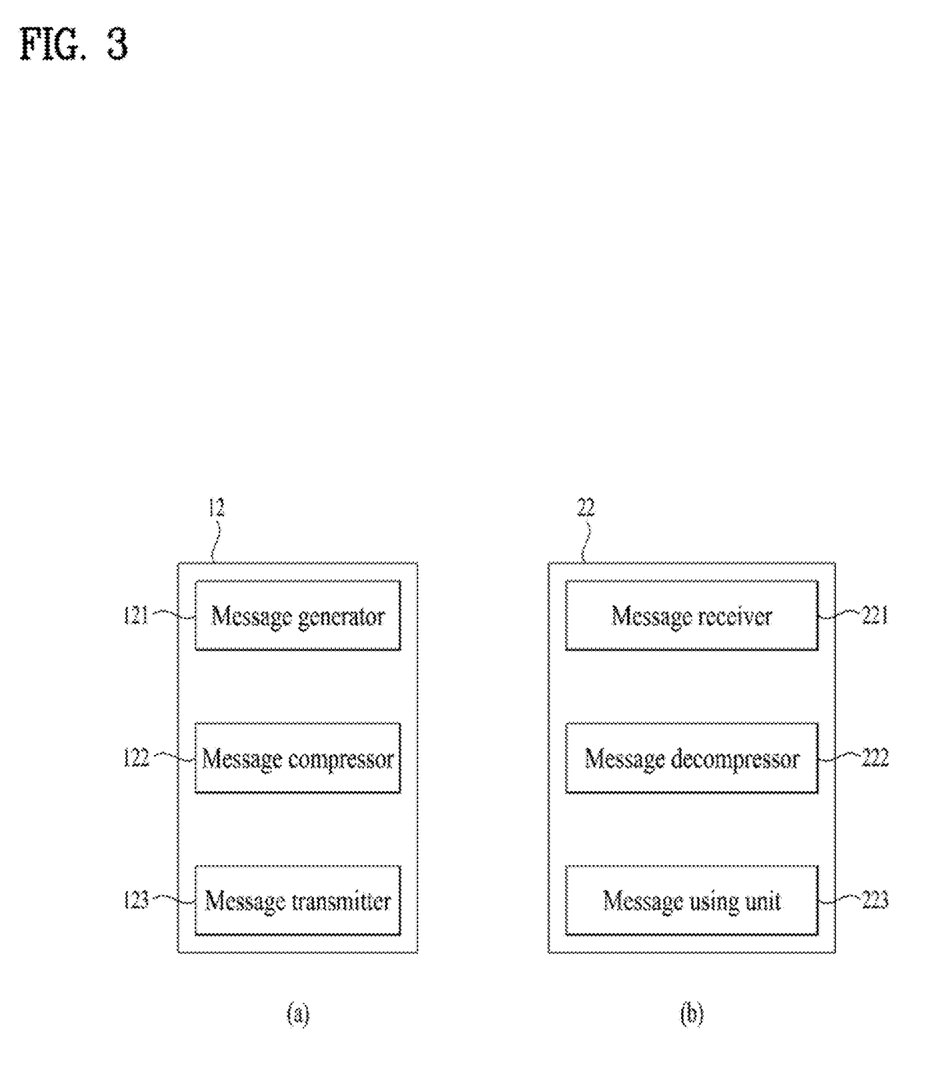
FIG. 3 is a block diagram of processors of transmitting and receiving devices exchanging V2P messages according to an embodiment of the present disclosure.

FIG. 3 is a block diagram of processors of transmitting and receiving devices exchanging V2P messages according to an embodiment of the present disclosure.

The processor 12 of the transmitting device 10 may include a message generator 121, a message compressor 122, and a message transmitter 123. The processor 22 of the receiving device 20 may include a message receiver 221, a message decompressor 222, and a message using unit 223. The names of the components of the processors 12 and 22 are merely exemplary, and the scope of the present disclosure is not limited thereto.

Generation, Compression, or Transmission of Messages

The message generator 121 may generate a V2P message to be transmitted to the receiving device 20. The V2P message basically includes a PSM. The PSM may include information about the type, location, direction, and speed of a VRU as described above, but the present disclosure is not limited thereto. That is, the PSM may include various information related to the VRU. To this end, the transmitting device 10 or processor 12 may collect various information related to the VRU, which is to be included in the PSM, and generate the PSM. The message generator 121 may generate the V2P message as described above.

The message compressor 122 may check whether a timer is running. When the timer is not running, that is, when the timer expires or does not start, the message compressor 122 may generate a new identifier and store the identifier in the memory 11. Then, the message compressor 122 may store the V2P message generated by the message generator 121 in the memory 11 as a lead message without compressing the V2P message. The lead message is also referred to as a lead V2P message.

Thereafter, the message generator 121 may request the message transmitter 123 to transmit the lead V2P message including the generated identifier and the PSM.

The message transmitter 123 may transmit the lead V2P message through the transceiver 13.

When the timer is not running, the message compressor 122 may compress the V2P message generated by the message generator 121 based on a previously stored lead V2P message.

Hereinafter, a method of compressing a V2P message will be described in detail. The V2P message compression method is based on the V2P message generation method described above.

The message compressor 122 may remove a predetermined field (e.g., a field having a static characteristic) from headers to be attached to a generated IEEE 1609.2 SAE J2735 PSM. In the present specification, removing a field means that a field in headers included in an uncompressed V2P message such as a lead V2P message is excluded from a message (i.e., compressed message). The message compressor 122 may calculate another predetermined field (e.g., a field represented by a delta value) based on the lead V2P message, and such a field may include only the delta value. In this case, the delta value means a value indicating a difference from the field value of the lead V2P message. Information in this state may be referred to as a compressed PSM. The message compressor 122 may encode the compressed PSM based on UPER.

Next, the message compressor 122 may generate security data of IEEE 1609.2 where the encoded compressed PSM is used as ToBeSignedData. The message compressor 122 may remove a predetermined field (e.g., a field having a static characteristic) from headers of the security data of IEEE 1609.2 based on the security data of IEEE 1609.2 in the lead V2P message. The message compressor 122 may calculate another predetermined field (e.g., a field represented by a delta value) based on the lead V2P message, and such a field may include only the delta value. Information in this state may be referred to as compressed IEEE 1609.2 security data. The message compressor 122 may encode the compressed IEEE 1609.2 security data based on OER.

Then, the message compressor 122 may generate a WSMP message of IEEE 1609.3 including the encoded compressed IEEE 1609.2 security data. In this case, a predetermined field (e.g., a field having a static characteristic) may be removed from headers of the WSMP message of IEEE 1609.3. The message compressor 122 may calculate another predetermined field (e.g., a field represented by a delta value) based on the lead V2P message, and such a field may include only the delta value. Information in this state may be referred to as a compressed WSMP message. The message compressor 122 may encode the compressed WSMP message based on the UPER.

Such a message generated after compression may be referred to as a compressed V2P message.

On the other hand, the first bit of a lead/compressed V2P message may be used as indicator information indicating whether the message is compressed. For example, 0 may indicate that the message is not compressed, and 1 may indicate that the message is compressed.

The message compressor 122 may request the message transmitter 123 to transmit the compressed V2P message including the previously stored identifier and the compressed PSM.

The message transmitter 123 may transmit the compressed V2P message through the transceiver 13.

Although it is described that that the message generator 121 and the message compressor 122 operate sequentially, the message generator 121 and the message compressor 122 may be integrated into one subject (e.g., a message generation and compression unit).

Reception, Decompression, or Decoding of Messages

The message receiver 221 of the receiving device 20 may receive a lead or compressed V2P message from the transmitting device 10 through the transceiver 23. In this case, an identifier may be received together.

The message receiver 221 may check a compression indicator in the received V2P message and check whether the received V2P message is compressed.

If it is confirmed that the received V2P message is not compressed, the message receiver 221 may store the received V2P message in the memory 21 together with the received identifier. Preferably, the received V2P message may be stored after being matching with the received identifier. In addition, the message receiver 221 may forward the received V2P message to the message using unit 223.

If it is confirmed that the received V2P message is compressed, the message receiver 221 may forward the compressed V2P message to the message decompressor 222 to decompress the compressed V2P message.

The message decompressor 222 may decompress the compressed V2P message. The decompression method will be described in detail.

The message decompressor 222 may check the identifier received together with the V2P message. If the received identifier is identical to a previously stored identifier, the message decompressor 222 may confirm that the lead V2P message is equivalent to the previously stored identifier.

The message decompressor 222 may recover a WSMP header of IEEE 1609.3 in the received compressed V2P message from a WSMP header of IEEE 1609.3 in the lead V2P message at network layers. As the field value of a predetermined field (e.g., a field having a static characteristic) in the WSMP header of IEEE 1609.3, the value of the same field in the lead V2P message may be used.

In addition, the field value (i.e., delta value) of another predetermined field (e.g., a field represented by a delta value) of the WSMP header of IEEE 1609.3 may be obtained from the value of the same field in the lead V2P message. For example, a value obtained by adding the value of a specific field to the value of the same field of the lead V2P message may be used. The message decompressor 222 may acquire security data of IEEE 1609.2 based on the recovered WSMP header.

Thereafter, the message decompressor 222 may obtain a security header of IEEE 1609.2 at security layers according to the same method as the method of obtaining the WSMP header of IEEE 1609.3 described above. The message decompressor 222 may obtain a PSM of IEEE 1609.2 SAE J2735 based on the obtained IEEE 1609.2 security header.

In addition, for the PSM of IEEE 1609.2 SAE J2735, the message decompressor 222 may obtain a header at application layers according to the same method as the method of obtaining the WSMP header of IEEE 1609.3 described above. The message decompressor 222 may obtain the PSM based on the obtained header.

The message decompressor 222 may forward the obtained PSM to the message using unit 223.

Although it is described that that the message receiver 221 and the message decompressor 222 operate sequentially, the message receiver 221 and the message decompressor 222 may be integrated into one subject (e.g., a message reception and decompression unit).

Figure 4:
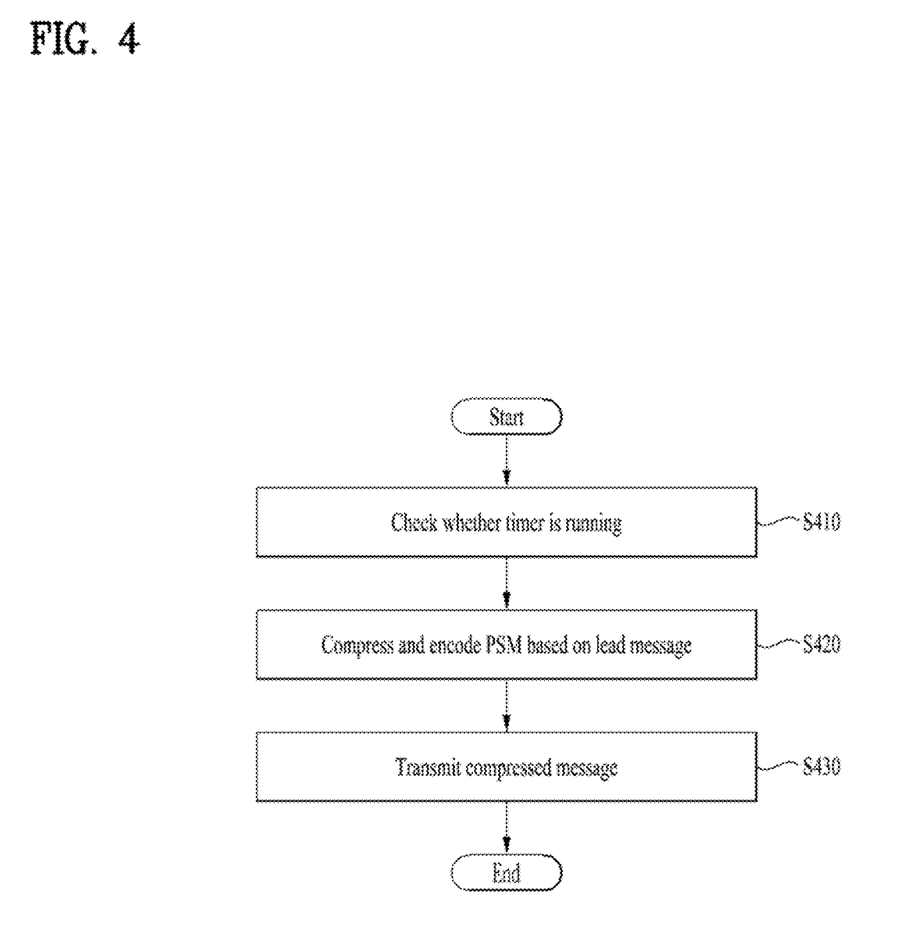
FIG. 4 is a flowchart of operations of transmitting a V2P message according to an embodiment of the present disclosure.

FIG. 4 illustrates a flowchart of operations of transmitting a V2P message according to an embodiment of the present disclosure. The transmission operations shown in FIG. 4 may be performed by the transmitting device 10.

The transmitting device 10 may check whether a timer is running (S410).

If the timer is running, the transmitting device 10 may compress and encode a PSM according to a predetermined method based on a stored lead V2P message (S420).

The transmitting device 10 may transmit a compressed V2P message including a previously stored identifier and the compressed PSM to the receiving device 20 (S430).

If the timer is not running, the transmitting device 10 may generate an identifier and store the identifier in the memory 11. Then, the transmitting device 10 may encode a PSM according to a predetermined method and store the encoded PSM in the memory 11 as a lead V2P message. The transmitting device 10 may transmit the generated identifier and the lead V2P message to the receiving device 20.

Details of V2P message transmission according to the present disclosure that has not been described with reference to FIG. 4 could be found in the details provided with reference to FIGS. 2 to 3.

Figure 5:
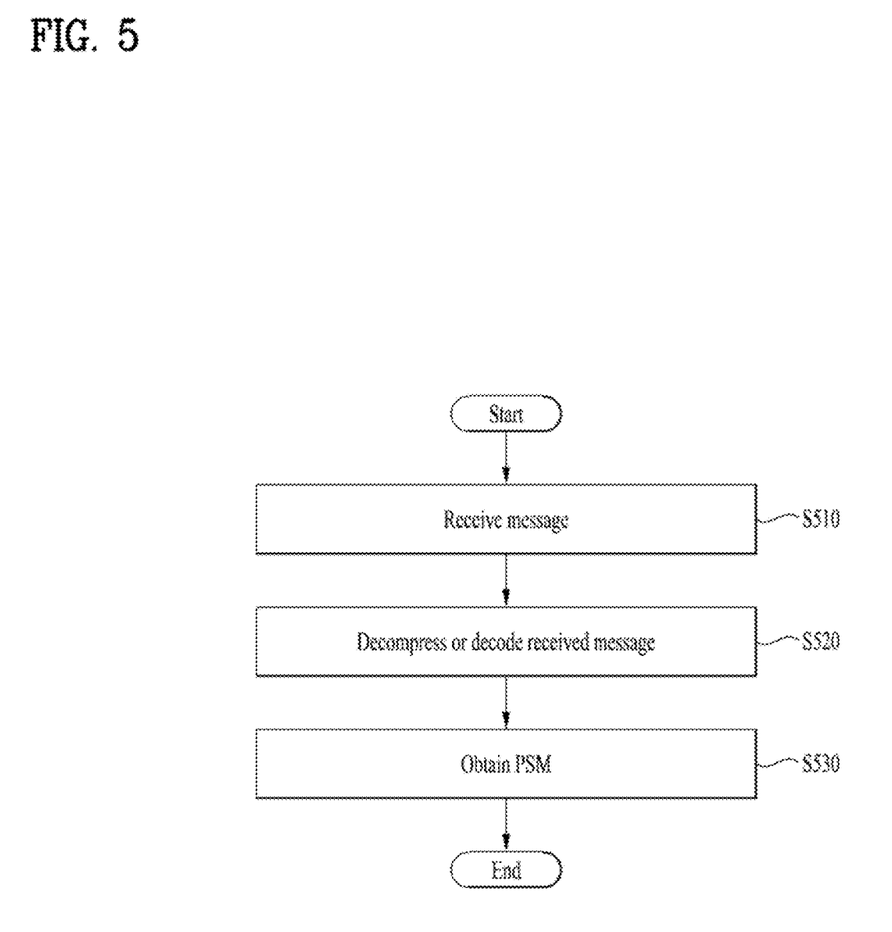
FIG. 5 is a flowchart of operations of receiving a V2P message according to an embodiment of the present disclosure.

FIG. 5 illustrates a flowchart of operations of receiving a V2P message according to an embodiment of the present disclosure. The reception operations shown in FIG. 5 may be performed by the transmitting device 10.

The receiving device 20 may receive an identifier and a V2P message from the transmitting device 10 (S510). The V2P message may include a compression indicator and a PSM.

If the compression indicator indicates that the PSM is compressed, the receiving device 20 may decompress or decode the received V2P message based on a previously stored lead V2P message corresponding to the received identifier (S520).

If the compression indicator indicates that the PSM is not compressed, the receiving device 20 may match the identifier in the received V2P message with the received V2P message and store the identifier and the received V2P message in the memory 22. Then, the receiving device 20 may decode the received V2P message.

The receiving device 20 may obtain the PSM by decoding the received V2P message (S530).

Details of V2P message reception according to the present disclosure that has not been described with reference to FIG. 5 could be found in the details provided with reference to FIGS. 2 to 3.

It has been described that the methods or procedures of the present disclosure are performed by the devices and components included therein (e.g., memories 11 and 21, processors 12 and 22, transceivers 13 and 23, message generator 121, message compressor 122, message transmitter 123, message receiver 221, message decompressor 222, message using unit 223, etc.). However, the names of the device and components included therein are merely exemplary, and the scope of the present disclosure is not limited thereto. In other words, the methods or procedures of the present disclosure may be performed by others rather than the devices. In addition, the methods or procedures may be performed by software for V2P message transmission and reception or code readable by computers or other machines or devices.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the spirit and scope of the disclosure. Therefore, the present disclosure is not limited to the embodiments disclosed herein but intends to give the broadest scope consistent with the new principles and features disclosed herein.

The invention claimed is:

1. A method of transmitting a vehicle-to-pedestrian (V2P) message, the method comprising:
   checking whether a timer is running;
   generating and storing an identifier when the timer is not running;
   encoding a personal safety message (PSM) according to a predetermined method and storing the encoded PSM as a lead V2P message; and
   transmitting the generated identifier and the lead V2P message,
   wherein the identifier is used to identify the lead V2P message and refer to the lead V2P message to decompress a compressed V2P message.

2. The method of claim 1, comprising:
   compressing and encoding a PSM according to the predetermined method based on the stored lead V2P message when the timer is running; and
   transmitting the compressed V2P message including the previously stored identifier and the compressed PSM.

3. The method of claim 1, comprising starting the timer after generating and storing the identifier.

4. The method of claim 2, wherein compressing the PSM comprises removing a predetermined field included in the lead V2P message from the compressed V2P message.

5. The method of claim 2, wherein compressing the PSM comprises, for a predetermined field in the PSM which is the same as the predetermined field in the lead V2P message, including a delta value corresponding to a difference from a value of the predetermined field of the lead V2P message as the predetermined field of the compressed V2P message.

6. The method of claim 1, wherein each of the lead V2P message and the compressed V2P message includes a compression indicator indicating whether the message is compressed.

7. A non-transitory computer-readable medium having stored thereon a computer program configured to perform the method defined in claim 1.

8. A method of receiving a vehicle-to-pedestrian (V2P) message, the method comprising:
   receiving the V2P message including an identifier, a compression indicator, and a personal safety message (PSM); and
   matching and storing the identifier and the received V2P message when the compression indicator indicates that the PSM is not compressed,
   wherein the received V2P message is stored as a lead V2P message, and
   wherein the identifier is used to identify the lead V2P message and refer to the lead V2P message to decompress a compressed V2P message.

9. The method of claim 8, comprising, when the compression indicator indicates that the PSM is compressed, decompressing the received V2P message based on a previously stored lead V2P message corresponding to the identifier.

10. The method of claim 8, comprising, when the compression indicator indicates that the PSM is compressed, discarding the received V2P message if an identifier which is the same as the received identifier is not previously stored.

11. The method of claim 9, wherein decompressing the received V2P message comprises restoring a predetermined field in the received V2P message to a field for a PSM of the previously stored lead V2P message.

12. A non-transitory computer-readable medium having stored thereon a computer program configured to perform the method defined in claim 8.

13. A transmitting apparatus configured to transmit a vehicle-to-pedestrian (V2P) message, the transmitting apparatus comprising:
   a memory;
   a processor; and
   a transceiver,
   wherein the processor is configured to:
   check whether a timer is running;
   generate and store an identifier when the timer is not running;
   encode a personal safety message (PSM) according to a predetermined method and store the encoded PSM as a lead V2P message in the memory; and
   control the transceiver to transmit the generated identifier and the lead V2P message,
   wherein the identifier is used to identify the lead V2P message and refer to the lead V2P message to decompress a compressed V2P message.

14. A receiving apparatus configured to receive a vehicle-to-pedestrian (V2P) message, the receiving apparatus comprising:
   a memory;
   a processor; and
   a transceiver,
   wherein the processor is configured to:
   control the transceiver to receive the V2P message including an identifier, a compression indicator, and a personal safety message (PSM); and
   match the identifier and the received V2P message and store the identifier and the received V2P message in the memory when the compression indicator indicates that the PSM is not compressed,
   wherein the received V2P message is stored as a lead V2P message, and
   wherein the identifier is used to identify the lead V2P message and refer to the lead V2P message to decompress a compressed V2P message.

* * * * *